United States Patent [19]

Hemmie

[11] 4,367,485
[45] Jan. 4, 1983

[54] TWO-WAY MICROWAVE TELEVISION SYSTEM

[75] Inventor: Dale L. Hemmie, Ft. Madison, Iowa

[73] Assignee: Telecom Engineering, Inc., Ft. Madison, Iowa

[21] Appl. No.: 242,169

[22] Filed: Mar. 10, 1981

[51] Int. Cl.³ .............................................. H04N 1/00
[52] U.S. Cl. ..................................... 358/86; 358/185; 434/323; 434/351; 455/5
[58] Field of Search ...................... 358/86, 93, 185, 85, 358/183, 181, 108, 141, 142; 434/323, 336, 350, 351; 455/5, 2

[56] References Cited

U.S. PATENT DOCUMENTS

| 2,668,907 | 2/1954 | Evans. | |
|---|---|---|---|
| 2,907,874 | 10/1959 | Halvorson. | |
| 3,606,688 | 9/1971 | Zawels et al. | |
| 3,665,311 | 5/1972 | Gargini | 455/5 |
| 4,266,242 | 5/1981 | McCoy | 358/183 |

OTHER PUBLICATIONS

Publication McGraw-Hill Encyclopedia of Science and Technology, vol. B, Chapter entitled "Television Networks", pp. 480–484, (1971).

Primary Examiner—Robert L. Griffin
Assistant Examiner—Edward L. Coles
Attorney, Agent, or Firm—Bacon & Thomas

[57] ABSTRACT

A two-way microwave television system for linking a master or teaching station with a plurality of sub-station schools via a single microwave link is presented. The sub-station schools are located at dispersed school sites and function as relay stations to complete a network covering a geographical area of greater dimensions than could be achieved by the master station unassisted. A single duplex microwave channel is used to transmit a picture originating at the master station and special effects generators located at each of the sub-station school relay sites combine, through a special video switching network, responses from each sub-station school to form an integrated frame containing the response from each sub-station in a format which can be transmitted on a single channel carrier.

5 Claims, 2 Drawing Figures

TWO-WAY MICROWAVE TELEVISION SYSTEM

TECHNICAL FIELD

This invention relates to a two-way microwave television system which combines a plurality of picture segments into a single presentation via a special effects generator so that a plurality of pictures may be transmitted simultaneously on a single microwave channel. Thus an educational television program may be transmitted to a plurality of learning sites, each of which can respond simultaneously and over a common channel.

BACKGROUND OF THE INVENTION

In many areas of the world, population density is such that it is impossible to provide educational programs to prospective students in sparsely populated areas because of the small class size. Attempts to provide such areas with special educational programs have failed because there are not enough qualified instructors to man the small, scattered sites and if an adequate number of instructors are available, the per-student cost is prohibitive.

With the advent of television, it has become possible for a single instructor to reach a plurality of small, remote classes. In such systems, a teacher presents a lesson, either live or via a video tape record. The program is transmitted to schools all over the area, but it suffers a significant disadvantage because the students are placed in a passive role. A student in a passive role has a very limited concentration period before his mind starts to wander. Thus educational television with a student in a passive role cannot meet the real demands of the educational system.

Attempts have been made, in educational TV, to place a student in a more active role. One such attempt is presented in U.S. Pat. No. 3,606,688 on "Method And Apparatus For Teaching A Multiplicity Of Students" issued to Zawels et al on Sept. 21, 1971. In this system, each remote classroom has a TV receiver and a means to respond to student answers invoked by questions presented by the program. However, the system has no way of providing true communication between a student and the lecturer and only a limited number of expected student responses can be coped with.

Other student response systems have been utilized wherein a telephone communication link is provided between remote classrooms and the instructor. In this type of system, the instructor is handicapped because of his inability or difficulty in identifying the student responding and the expense of the complex land line communication system is prohibitive.

Two-way television systems are available to solve this educational TV dilemma, however their cost has been prohibitively expensive due to the large amount of equipment required to link a plurality of educational sites. One such system which could be used is presented in U.S. Pat. No. 2,907,874 on "Microwave Communication System" issued to R. Halvorson on Oct. 6, 1958. This system utilizes a plurality of repeater stations, each of which have multiplexing equipment that could conceivably be used to tie a classroom receiver-transmitter into the link. Systems such as this are costly and the initial installation expense coupled with the maintenance requirements far exceeds the expenditure of providing individual instructors at each sub-station. Therefore, television microwave communication systems including a plurality of sub-stations having multiplex equipment provides a workable solution to the educational TV dilemma but financially the approach is not practical.

OBJECTIVES OF THE INVENTION

Therefore, it is a primary objective of the present invention to provide a microwave television system having two-way capability for linking a master instructor station to a plurality of learning stations via a single channel duplex microwave network.

A further objective of the present invention is to provide a plurality of repeater stations for a microwave television communication network wherein each repeater station may simultaneously transmit an audio/video signal.

A still further objective of the present invention is to provide a multiplexing arrangement for a microwave television system wherein a plurality of video pictures are combined to form a multiple segment picture by special effects generators such that all pictures may be simultaneously transmitted over a single channel.

A further objective of the present invention is to provide an educational television system utilizing a microwave communication network combined with special effect generator mixing of plural picture elements capable of transmitting and receiving a single video presentation in one direction and transmitting and receiving a plurality of video pictures in the opposite direction.

A further objective of the present invention is to provide a two-way microwave educational television system which is economical to install and maintain.

The foregoing and other objectives of the present invention will become apparent in light of the specification, drawings, and claims which follow.

BRIEF SUMMARY OF THE INVENTION

The two-way microwave educational television system disclosed herein is comprised of a master or teaching station and a plurality of secondary or school stations. All of the stations are linked by a microwave relay network with all school stations except the school station at the end of the network, functioning as relay stations. The school stations functioning as relay stations include a special effects generator and a video switching network whereby the video presentation originating at each school station is combined to form a multi segment picture that is transmitted to the master or teaching station where it is displayed on a monitor which enables the instructor to view all of the remote classrooms simultaneously.

DETAILED DESCRIPTION OF THE INVENTION

Figure 1:
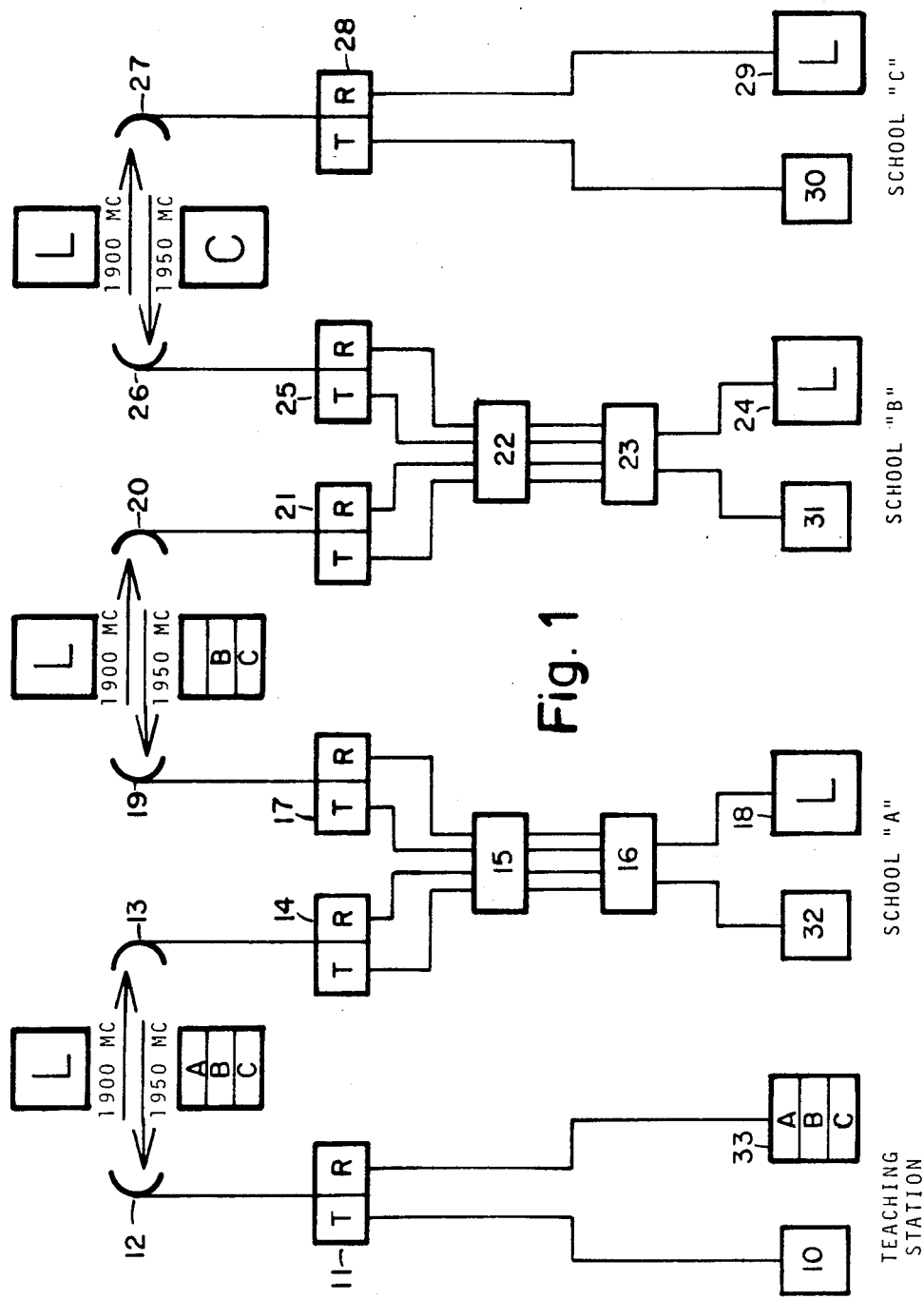
FIG. 1 illustrates a basic, four schooling microwave interlink system.

In the basic four school microwave interlink system of FIG. 1, the teaching station includes a video camera 10 such as a Panasonic Model WV-3800. This camera records the classroom lecture which is transmitted over the duplexed microwave network as picture L via the transmitter portion of receiver-transmitter 11 and parabolic antenna 12. Any current state of the art microwave receiver-transmitter and antenna may be used. An example of an acceptable receiver-transmitter may be found in the Halvorson U.S. Pat. No. 2,907,874.

Lesson L is thus transmitted on a 1900 MC carrier to microwave antenna 13 at sub-station school A. The signal is detected by the receiver portion of receiver-transmitter 14 which may be identical to receiver-transmitter 11. This signal is then coupled via the video switching network 15 to the special effects generator 16 and receiver-transmitter 17. The special effects generator 16 may be a Panasonic Model WJ-4600 or WJ-5500 or similar and it drives the video monitor 18 which presents the lesson L program to the remote classroom.

Receiver-transmitter 17 may be similar to receiver-transmitter 11 or 14 and the lesson L signal received from the receiver of receiver-transmitter 14 via video switching network 15 is transmitted therefrom via antenna 19 to antenna 20 of sub-station school B as video lesson L on a 1900MC carrier. Sub-station school B contains equipment identical to sub-station school A and the received lesson L is detected by the receiver portion of receiver-transmitter 21, coupled via video switching network 22 and special effects generator 23 to video monitor 24 and via video switching network 22 to the transmitter portion of receiver-transmitter 25.

Receiver-transmitter 25 transmits picture lesson L on a 1900MC carrier via antenna 26 to antenna 27 of sub-station school C.

Sub-station school C includes a receiver-transmitter 28 which may be similar to the receiver-transmitters utilized by the master teaching station or any of the other school sub-stations. The receiver portion of this receiver-transmitter is coupled to video monitor 29 which presents lesson L to the remote classroom at school C.

A video camera 30 such as a Panasonic Model WV-3800 located at sub-station school C is positioned to record the students in the classroom. This picture is transmitted via receiver-transmitter 28 over the duplexed microwave network via antenna 27 to sub-station school B on a 1950MC carrier.

The classroom picture C from sub-station school C is received by microwave antenna 26 and detected by the receiver portion of receiver-transmitter 25 at sub-station school B. This signal is coupled via video switching network 22 to the special effects generator 23 which modifies the received picture so that it occupies a predetermined portion of the video frame.

Video camera 31, which may be a Panasonic Model WV-3800 is focused on the classroom in sub-station school B and the picture thus detected is coupled to special effects generator 23. Special effects generator 23 processes the signal from camera 31 so that it occupies a predetermined segment of the video frame not occupied by the view from classroom C. To accomplish the combining of the classroom C and B pictures, the special effects generator must have a sync lock circuitry that allows mixing of non-synchronous video signals with synchronous video signals. This feature is found in the Panasonic Model WJ-4600 or WJ-5500 and therefore either one of those special effects generators will function in this system. Furthermore, camera 31 must have the ability to produce a video signal which is synchronized by an external sync signal. The Panasonic Model WV-3800 has this capability and therefore will function within the system. A further constraint on the special effects generator is that it must incorporate a signal generator capable of providing a sync signal based on the received video frame from sub-station school C and provide that signal to camera 31 so that the classroom B and classroom A video signals will be synchronous. A single video frame combining the classroom B and classroom C views is coupled from the special effects generator 23 via video switching network 22 to the transmitter portion of receiver-transmitter 31 which, via microwave antenna 20 transmits the composite frame on a 1950MC carrier to microwave antenna 19 of sub-station school A.

Sub-station school A has a special effects generator 16 similar to the special effects generator 23 of sub-station school B and a video camera 32 similar to video camera 31 of sub-station school B. Video camera 32 is trained on a classroom scene in sub-station school A and this information is placed on a predetermined portion of a video frame by special effects generator 16. The composite signal received by antenna 19 is processed by the receiver portion of receiver-transmitter 17 and coupled to special effects generator 16 by the video switching network 15. In the special effects generator, the composite frame creates a synchronizing signal to synchronize camera 32 so that the special effects generator 16 may create a new composite frame comprised of classroom scenes A, B and C. This composite frame is then coupled via video switching network 15 to the transmitter portion of receiver-transmitter 14 and then via microwave antenna 13 on a 1950MC carrier to microwave antenna 12 at the teaching station.

The 1950MC signal received at the teaching station is detected by the receiver portion of receiver-transmitter 11 and coupled to video monitor 33 which displays a composite video frame comprised of the views from classrooms A, B and C.

In the preceding exemplary system, Panosonic equipment is utilized, however it should be understood that any special effects generator with a sync generator system and any video camera with an external sync mode may be utilized.

In the exemplary system described, each classroom scene occupies one-third of the frame at the teaching station. The signal transmitted from sub-station school C is a full frame picture but the signal transmitted from sub-station school B to sub-station school A has data in two-thirds of the frame, the view from classrooms B and C each occupying one-third of the total frame. At sub-station school A, the view from classroom A fills the final third of the frame. It should be understood that this is an exemplary system and more sub-station schools such as A or B may be incorporated in the system. The maximum number of classrooms served is a function of the maximum number of segments the special effects generator can process in a frame.

Figure 2:
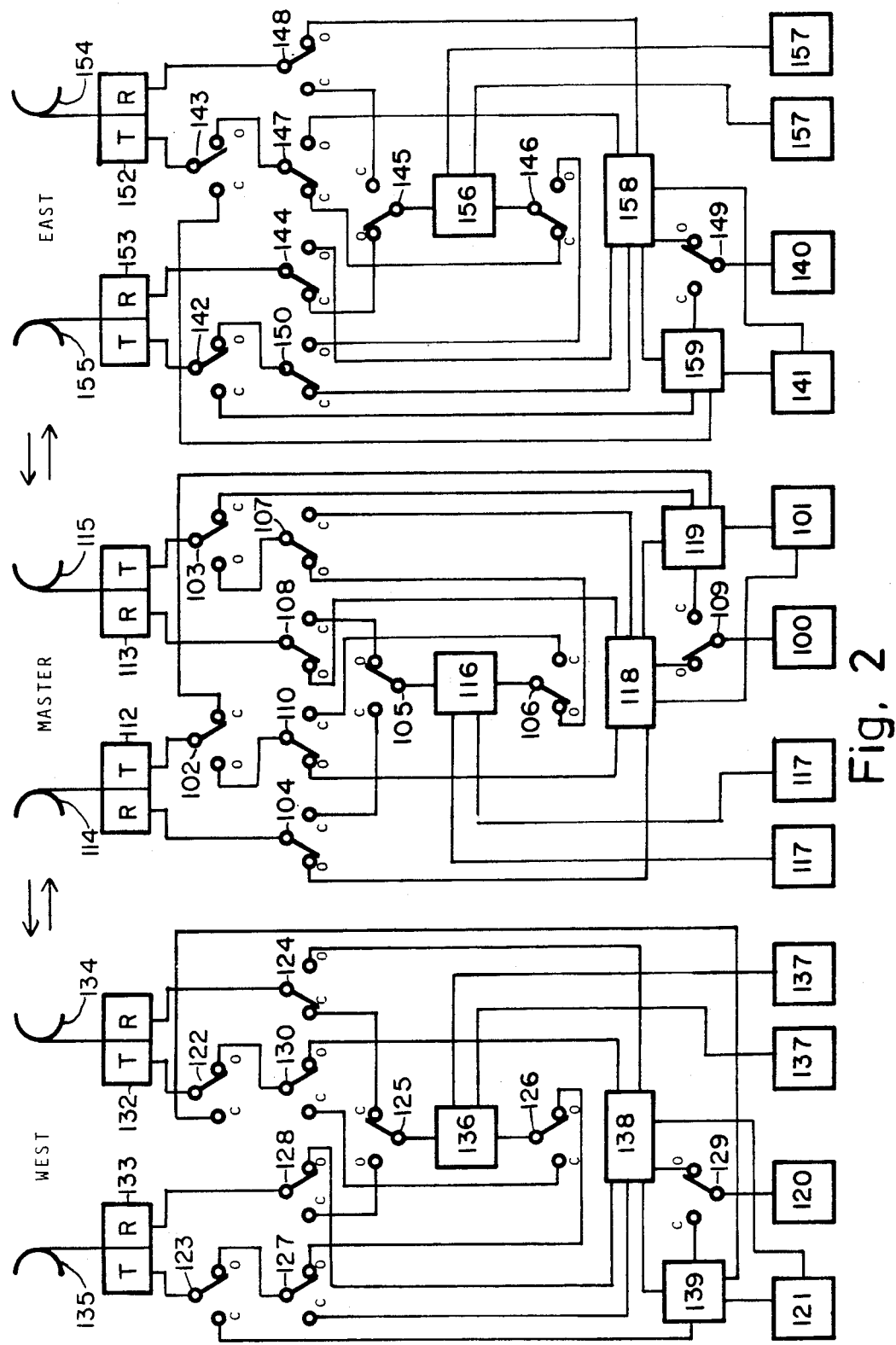
FIG. 2 schematically presents the video switching system as applied to a plurality of stations which may function as teaching or student stations.

The two-way microwave educational television system illustrated in FIG. 1 is a basic system which has been presented to simplify system operation. More complex networks may be assembled to provide a more flexible system. The nucleus of such a complex system is illustrated in FIG. 2 wherein three nucleus stations have the capability of functioning as either a master teaching station or a sub-station school. FIG. 2 also illustrates in detail the video switching network which accomplishes the interconnections of the various receiver-transmitters, special effects generators and video cameras so that composite video frames may be generated and transmitted.

In FIG. 2, the center school is configured to function as a master teaching station and it utilizes receiver-transmitters, special effects generators and video cameras of the same type utilized in the system illustrated in FIG. 1.

A lesson to be transmitted is recorded by video camera 101 which is electrically connected to pins C of video switching network switches 102 and 103. These switches are single-pole double-throw switches connected to the transmitters of receiver-transmitter means 112 and 113 respectively. Receiver-transmitter 112 is coupled to microwave antenna 114 which serves an eastern network link and receiver-transmitter 113 is coupled to microwave antenna 115 which serves a western microwave link. Each antenna transmits the lesson via a 1900MC carrier to the respective east or west network link.

In the west network, the signal is received by antenna 134 and processed by the receiver of receiver-transmitter 132. The video signal thus detected is coupled via the C contact of switch 124 to the C contact of switch 125 which couples the signal to the video distribution network 136 from where the received lesson is coupled to student monitors 137 and switch 126. Switch 126 couples the lesson video through switch 127 and 123 from where it is processed by the transmitter of receiver-transmitter 133 to be transmitted on a 1900MC carrier by microwave antenna 135 in a westerly direction.

The same problem recorded by video camera 101 is transmitted on a 1900MC carrier from microwave antenna 115 in an easterly direction and detected by microwave antenna 155 and receiver-transmitter 153. The signal received by receiver-transmitter 153 is coupled through switch 144 to switch 145 and then to video distribution network 156 and then to student monitors 157 in a manner similar to a like operation in the western network. The lesson is also coupled from the video distribution network 156 through switch 146 and switches 147 and 143 to the transmitter of receiver-transmitter 152 from where it is radiated via microwave antenna 154 on a 1900MC carrier in an easterly direction.

The pictures of the classrooms in the western network originating at schools not illustrated in FIG. 2 are received by microwave antenna 135 and detected by the receiver portion of receiver-transmitter 133. This signal may be a single classroom scene if only one additional school is contained in the western network or it may be a composite if a plurality of additional school sub-stations are in the western network. The signal, regardless of its composure, is coupled via the switch 128 to the special effects generator 138. This video signal creates a sync signal in special effects generator 138 which is coupled to the external sync input of video camera 121. Video camera 121 is trained on the classroom and the class picture is coupled via video distribution network 139 to the special effects generator 138. Here, the classroom scene is combined as an additional segment with the classroom scene composite received from the western network via microwave antenna 135. This composite scene may be viewed on the instructor monitor 120 via switch 139. Note that switch 139 may alternately be placed in the C position where it will monitor the classroom scene as viewed by camera 121 without the additional classroom composites.

The composite formed by special effects generator 135 is then coupled via switches 130 and 122 to the transmitter portion of receiver-transmitter 132 and thence via microwave antenna 134 to microwave antenna 114 of the teaching master station.

Programs originating in the eastern network by stations not illustrated in FIG. 2, are received by microwave antenna 154 as a single classroom scene or a composite classroom scene, dependent upon the number of classroom stations east of the illustrated station, in a manner similar to that described for the western link. That is, the received signal from microwave antenna 154 is processed by the receiver of receiver-transmitter 152 and coupled via switch 148 to the special effects generator 158. Special effects generator 158 creates a sync signal which is coupled to the sync input of video camera 141 which is trained on a classroom scene. The classroom scene received by video camera 141 is coupled via video distribution network 159 to the special effects generator 158 where it is combined in the video frames received via microwave antenna 154 in a manner similar to that described for the western network. This composite signal may be viewed on the instructors monitor 140 or, if switch 149 is placed in the C position, the instructors monitor will portray only the scene viewed by camera 141. The composite signal is also coupled from the special effects generator 158 via switches 150 and 142 to the transmitting section of receiver-transmitter 153 from where it is transmitted via microwave antenna 155 on a 1950MC carrier to microwave antenna 115.

The composite signal received by the master teaching station from the western network via receiver-transmitter 112 is coupled via switch 104 to special effects generator 118 and the composite video received from the eastern network via receiver-transmitter 113 is coupled via switch 108 to the special effects generator 118. These two composite frames are recompiled by special effects generator 118 to form a single composite frame which is viewed on the instructors monitor 100 via the interconnection provided by switch 109.

In the embodiment illustrated in FIG. 2, video distribution network 119 serves a similar function to networks 139 and 159 in the west and eastern networks except, due to the positioning of the switches of the video switch network, the scene recorded by the associated camera is transmitted as a full frame presentation. If the comparable switches in either the western or eastern station are placed in accordance with the positioning of the master station, that particular station will then assume functions of a master station. When functioning as a master station, student monitors are not functional, as can be seen in FIG. 2 for student monitors 117. Note that their associated video distribution network 116 is disconnected from all circuits as a functioning of the positioning of switches 105, 108, 106, 107 and 103. Note also that the composite frame generated by special effects generator 118 is available only to the instructors monitor via switch 109 when the switches are placed in the master teaching station configuration due to the open circuit condition created by switches 110 and 102.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A two-way television system, comprising:

a master station, including, a video camera means for generating a first video signal, means for transmitting said first video signal, means for receiving a composite video signal, and a video display means for displaying said composite video signal;

a relay station including, a first receiver means for receiving said first video signal, a first transmitter means for transmitting said received first video signal, a second receiver means for receiving a second video signal, a video camera means for generating a third video signal, a special effects generator means for creating said composite video signal by combining said second and third video signals, a second transmitter means for transmitting said composite video signal, and a video display means for displaying said first video signal; and a remote station, including means for receiving said first video signal transmitted by said first transmitter means, a video display means for displaying said first video signal, a video camera means for generating said second video signal, and means for transmitting said second video signal.

2. A two-way television system as defined in claim 1 wherein said relay station includes video switching means for selectively interconnecting;

said first receiver means to said first transmitter means, said second receiver means to said special effects generator means, said video camera video means for generating a third video signal to said special effects generator means, and said special effects generator to said second transmitter means.

3. A two-way television system as defined in claim 2, comprising:

means for synchronizing said third video signal with said second video signal.

4. A video switching network, comprising:

a first single-pole double-throw video switch for connecting a transmitter to a video distribution network in a first position or to a second single-pole double-throw video switch in a second position;

said second single-pole double-throw video switch including first contact means connected to a special effects generator and second contact means coupled to a contact of a third single-pole double-throw switch having a contact arm connected to a second video distribution network and the second contact of which is connected to a contact of a fourth single-pole double-throw video switch whose other contact is connected to said special effects generator and whose movable contact is connected to a contact of a fifth single-pole double-throw video switch whose other contact is connected to said first video distribution network and whose movable contact is connected to a second transmitter means; and a sixth single-pole double-throw video switch having a movable contact connected to a first receiver means and one contact connected to said special effects generator and a second contact connected to a contact of a seventh single-pole double-throw video switch whose movable contact is connected to said second video distribution network and said other contact is connected to a contact of an eighth single-pole double-throw video switch whose other contact is connected to said special effects generator and whose movable contact arm is connected to a second transmitter means.

5. A switching network as defined in claim 4 further including a video camera connected to said first video distribution network and a video display means connected to said second video distribution network.

* * * * *